(12) United States Patent　　　(10) Patent No.:　US 12,664,396 B2

Sousa　　　　　　　　　　　　　　　(45) Date of Patent:　Jun. 23, 2026

(54) FRAMEWORK FOR ESTIMATION OF RESOURCE USAGE AND EXECUTION TIME OF WORKLOADS IN A HETEROGENEOUS INFRASTRUCTURE

(71) Applicant: EMC IP Holding Company LLC, Hopkinton, MA (US)

(72) Inventor: Eduardo Vera Sousa, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1170 days.

(21) Appl. No.: 17/450,412

(22) Filed: Oct. 8, 2021

(65) Prior Publication Data

US 2023/0111378 A1　　　Apr. 13, 2023

(51) Int. Cl.
*G06N 3/02*　　　　　(2006.01)
*G06F 9/50*　　　　　(2006.01)

(52) U.S. Cl.
CPC ............. *G06N 3/02* (2013.01); *G06F 9/5033* (2013.01)

(58) Field of Classification Search
None
See application file for complete search history.

(56) References Cited

U.S. PATENT DOCUMENTS

| | | | |
|---|---|---|---|
| 2019/0319977 A1* | 10/2019 | Gottschlich | ........... G06F 18/214 |
| 2021/0240539 A1* | 8/2021 | Murthy | ..................... G06F 8/60 |
| 2021/0306232 A1 | 9/2021 | Sousa et al. | |
| 2023/0017085 A1 | 1/2023 | Vera Sousa et al. | |

OTHER PUBLICATIONS

"Neural Networks, Structure, Weights and Matrices," Klein, Python-Course, 2024 (Year: 2024).*

* cited by examiner

*Primary Examiner* — Michael J Huntley
*Assistant Examiner* — Paul J Breene
(74) *Attorney, Agent, or Firm* — Workman Nydegger

(57)　　　　　　　ABSTRACT

One example method includes performing the various operations concerning a model that is operable to predict resource usage and execution time of computing workloads. The operations include extracting a fingerprint associated with telemetry data, and the telemetry data was generated based on performance of one of the computing workloads, in a constrained infrastructure, checking a fingerprint catalog to determine if there is a same or similar fingerprint to the fingerprint, when the same or similar fingerprint is found in the fingerprint catalog, inferring that the model includes information about the computing workload and the model is able to predict telemetry data and execution time for the computing workload in a target infrastructure, and when the same or similar fingerprint is not found, inserting the extracted fingerprint into the fingerprint catalog, and generating a retrained model by retraining the model using the telemetry data associated with the extracted fingerprint.

20 Claims, 10 Drawing Sheets

ENCODER

ENCODED MAIN FEATURES — 404

DECODER

500

CPU USAGE (%)

1 cores     3 cores     5 cores     7 cores     10 cores

RAM USAGE (%)

10 cores     7 cores 5 cores 1 cores 3 cores 1 cores     3 cores     5 cores     7 cores     10 cores EXECUTION TIME (s)

1 cores     3 cores     5 cores     7 cores     10 cores

600

DNN Train execution time with 10.0% of the cores available (MAE: 0.361)

DNN Train execution time with 30.0% of the cores available (MAE: 0.301)

DNN Train execution time with 50.0% of the cores available (MAE: 0.173)

DNN Train execution time with 70.0% of the cores available (MAE: 0.173)

1000

FRAMEWORK FOR ESTIMATION OF RESOURCE USAGE AND EXECUTION TIME OF WORKLOADS IN A HETEROGENEOUS INFRASTRUCTURE

FIELD OF THE INVENTION

Embodiments of the present invention generally relate to computing resource management. More particularly, at least some embodiments of the invention relate to systems, hardware, software, computer-readable media, and methods for building job scheduling plans using resource usage and execution prediction times in various different infrastructures.

BACKGROUND

Enterprises have a great interest in determining how quickly a computing workload may execute, and in determining what the computing resources are that are needed to support timely execution. As well, an enterprise may need to know whether or not its current infrastructure can support the workload and, if not, what changes may need to be made to the infrastructure. However, attempts to obtain such information have often proven problematic.

For example, information about the telemetry data and execution time of a workload is important when building a control plan. It allows the mapping of the number of workloads that can be placed simultaneously in an infrastructure. Round robin-based approaches do not guarantee optimal allocation and the main consequence of this is that SLA violation may incur.

Further, similarity between workloads is not explored in typical approaches. One of the main problems when building a control plane is the fact that there is no metric on how similar two workloads are. Thus, it may be difficult or impossible to cluster workloads accordingly to their telemetry data, and then use these clusters as inputs for building control planes, or optimizing some infrastructure to run a specific type of workload, such as neural network training for example.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
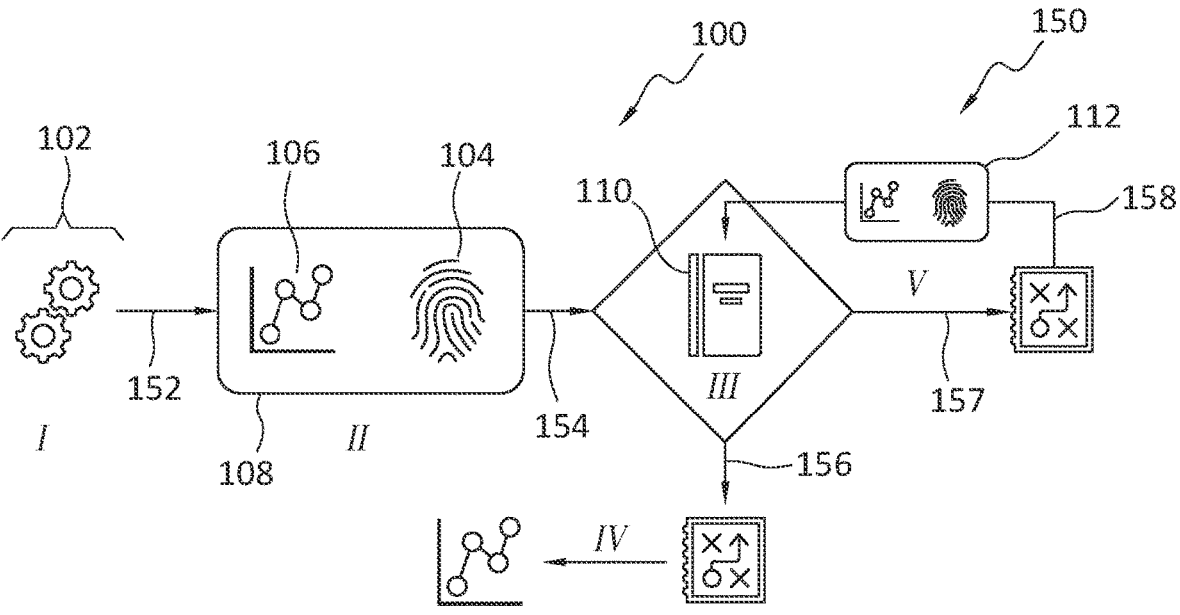
FIG. 1 discloses aspects of an example architecture operable to provide telemetry data for control planes.

Embodiments of the present invention generally relate to computing resource management. More particularly, at least some embodiments of the invention relate to systems, hardware, software, computer-readable media, and methods for building job scheduling plans using resource usage and execution prediction times in various different infrastructures.

In one example embodiment, given a computing workload wi (I), an embodiment may extract a fingerprint F(wi) associated with the telemetry data in a constrained environment E(II). Next, the embodiment may check if F(wi) has a similar entry in a fingerprint catalog, given a threshold ∈(III). If a similar fingerprint is found, it means that the model already encodes information about this workload or a similar workload, and the model is able to correctly predict the telemetry data and execution time. Thus, an embodiment may then proceed to an inference process in order to get the telemetry data in the target infrastructure (IV). On the other hand, if no key similar to F(wi) is found on the catalog, it means that the model does not recognize this telemetry behavior. Thus, the entry must be inserted on the catalog (IV) and the model must be retrained using the catalog data. Once retrained, this model may then replace the previous one.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Cloud computing has gained the attention of businesses because of its benefits, which include pay-per-use computation at the customer side and resource sharing at the provider side. Through virtualization, the main technology behind clouds, it is possible to abstract a pool of computation devices and offer computational resources better tailored to customer needs, who might contract more computation as their necessities grow. In this environment, other resource abstractions emerged, the most prominent example being containers. It is also possible to offer computing without the customer knowledge about what underlying infrastructure is running their code. This can be achieved in the Platform as a Service (PaaS) paradigm and the Function as a Service (FaaS, serverless computing) paradigm.

In each of these paradigms, the usual agreements upon quality of service (QoS) expected by the customer are expressed through several Service Level Agreements (SLAs). These SLAs typically include response time, execution time, uptime percentage, among other metrics. The SLAs are usually agreed prior to the service through target metrics reference values. Providers aim at respecting these targets in order to avoid contractual fines. Furthermore, failing to meet the targets also diminishes the perceived trust of the provider by the customer.

One way to ensure SLAs are met is to dedicate a large, static, amount of resources to each customer. However, there are at least two problems with this approach. First, in general, an application cannot be assumed to be bounded by one particular resource. Some applications, for example, might have an 10-intensive phase and, afterwards, a compute-intensive phase. Dedicating a large amount of all resources to an application is often inefficient, resulting in spare resources at the different phases of the application. On the other hand, the initial guess on how much resources are needed to run an application might be over- or underestimated.

Assuming a provider with a large pool of computational resources any particular application does not need to care about resource constraints, that is, from the point of view of the application, more resources are always available within reasonable limits established by the SLA. However, from the point of view of the provider who deals with many customers concurrently, the volume of spare resources dictates how many jobs can be run in parallel while respecting SLAs. In this sense, optimizing the adaptation of resource allocation of a single job impacts the efficiency of the entire system.

In contrast with SLAs, which are set prior to the execution of a job, the execution environment may be quite dynamic. New workloads might compete for resources and unplanned demand peaks might occur, which could disrupt the original workload planning due to tasks with higher priorities, greater needs to share the environment and overheads because of context switching. Service providers always aim to provide services to their customers respecting SLAs and minimizing resource usage. This is the scenario that provides the optimal profit for the service provider. To do so, a static approach of allocation, which dedicates resources to a job from its start through its completion, is naturally inefficient, and, thus, sub-optimal.

In view of considerations such as those just noted, example embodiments may implement a framework for forecasting the telemetry data associated to a workload in a specific infrastructure while providing a mechanism to handle new workload data and re-training the model if needed. The predicted telemetry data may be particularly useful when building scheduling plans for workloads to ensure SLA. Experiments show that example embodiments are able to predict the telemetry behavior with small error, even for different types of workloads.

In more detail, the usage of resources and the execution time of a workload in different infrastructure plays an important task when building a scheduling plan. By using this information, the scheduling algorithm may be improved, since it would be able to determine if multiple workloads could run in the same infrastructure without impact on its performance or, if the multi-cloud context is considered, assess the cost of placing a workload in a specific infrastructure. Thus, example embodiments may implement a framework for obtaining data for building scheduling plans. The framework may include a model for predicting resource usage and execution time of a workload under different infrastructures.

B. Aspects of Some Example Operating Environments

The following is a discussion of aspects of example operating environments for various embodiments of the invention. This discussion is not intended to limit the scope of the invention, or the applicability of the embodiments, in any way.

Example cloud computing environments, which may or may not be public, include storage environments that may provide data protection functionality for one or more clients, as well as cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

C. Aspects of Some Example Embodiments

In general, example embodiments may implement a framework for resource usage and execution time estimation. More particularly, embodiments may implement a framework for resource usage and execution time estimation given an infrastructure k. An example process according to some embodiments may comprise two parts: (a) the telemetry data prediction in the infrastructure k, represented as Tk, and (b) a querying process to check if the forecasting model was trained for some workload and/or infrastructure, and re-training, if needed. More particularly, example embodiments may operate to train a DNN (Deep Neural Network) model using the set $\{TE(wi), Tk(wi)\}$, where $TE(wi)$ is the telemetry data associated to the execution of the workload $wi$ in a constrained environment E. In this context, a constrained environment E refers to an infrastructure with a static specific setup, such as 4 cores and 16 Gb of RAM, for example. An example pipeline of a framework 100 configured and operable to provide, such as by way of a method 150, telemetry data for control planes is disclosed in FIG. 1, discussed below.

C.1 Example Framework and Method

Particularly, and with reference to the example of FIG. 1, given a workload wi (I) 102, a fingerprint F(wi) 104 may be extracted 152 that is associated to the telemetry data 106 in a constrained environment E (II) 108. A check may be performed 154 to determine if F(wi) has a similar entry in a fingerprint catalog, given a threshold ∈ (III) 110. If a similar fingerprint is found, it may mean that the model already encodes information about this workload 102, or a similar workload, and the model is able to predict the telemetry data and execution time correctly. Thus, the method may proceed 156 to the inference process in order to get the telemetry data in the target infrastructure (IV). On the other hand, if no key similar to F(wi) is found on the catalog, it means that the model does not recognize this telemetry behavior. Thus, the method 150 may proceed 157 and an entry must be inserted 158 in the catalog (V) and the model must be retrained using the catalog data. Once retrained, this model may replace the previous model.

C.2 Telemetry Data Forecasting

In general, embodiments may provide for a neural network that forecasts the time to finish and the telemetry behavior, and this neural network may form an element of frameworks according to example embodiments. The training dataset of a DNN may rely on, or comprise, two different datasets: the first is the telemetry data of the workload executed in a constrained environment, with a fixed number of cores and memory, for example; and, the second is the telemetry data of a workload executed on the target infrastructure alongside its execution time.

Telemetry data, as employed in example embodiments, may be represented as an aligned multi-channel time series. Each channel may be related to a different telemetry feature such as, for example, like CPU (Central Processing Unit), GPU (Graphics Processing Unit) and memory usage, for example. By using an approach based on windowing without overlapping to encode the data before using it as input for the DNN, embodiments may represent each timestamp as a feature of a model.

Thus, a model with a window size of 10 and two channels (CPU and RAM usage, for example), would have (10+10) features, that is, 10 timestamps for each of 2 channels. For the target data, in this example, there would be (10+10+1) features since in addition to the timestamps for the features, that is, 10+10, the windows 202 and 204 would also include, or encode, an execution time for the model. Each composition refers to a sample of the dataset. Am input feature window composition is depicted in the configuration 200 in FIG. 2, where windows 202 and 204 are composed over the two example channels of telemetry data. In this situation, all the points inside $w_1$ 202 for example, are organized side-by-side and then stacked over all the reorganized points of $w_2$ 204, and so forth. Thus, FIG. 2 presents an example window composition over telemetry data represented as a multi-channel time series.

Figures 2, 3:
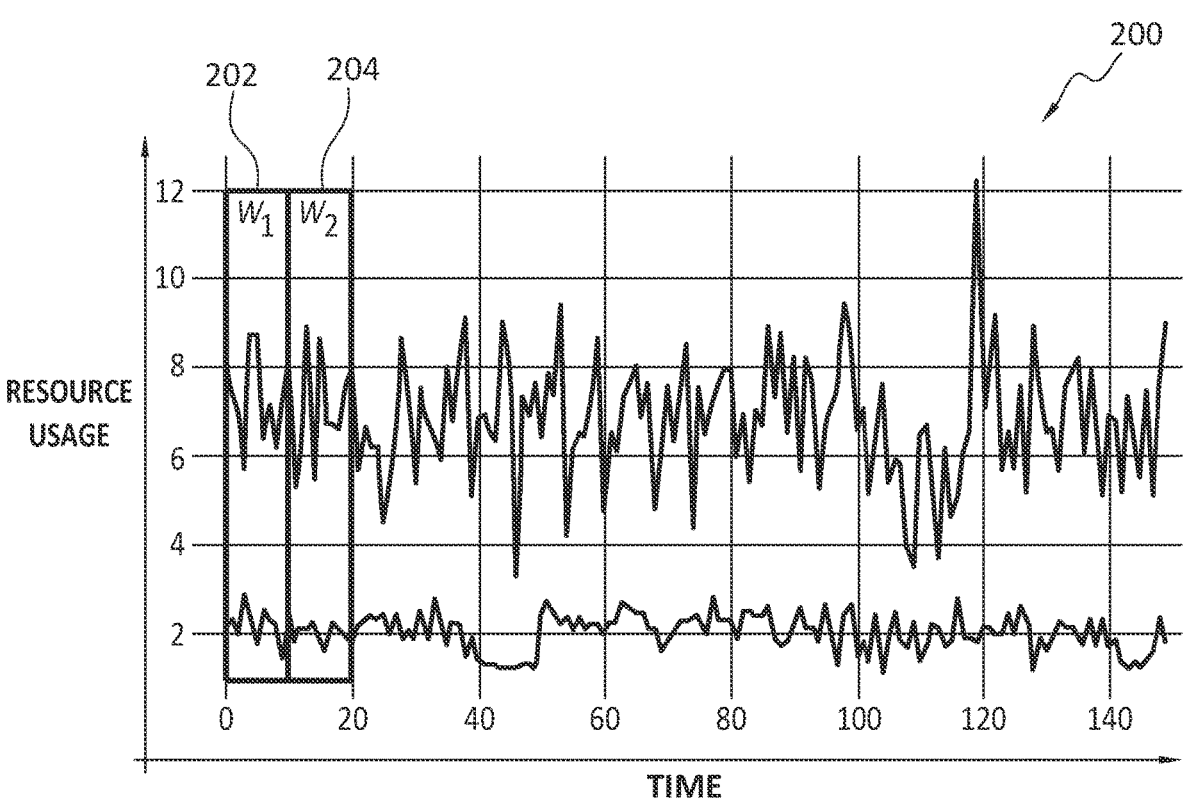
FIG. 2 discloses aspects of an example window composition over telemetry data represented as a multi-channel time series.
FIG. 3 discloses aspects of an example deep neural network architecture used in various experiments.

In brief then, and with reference to the example neural network architecture 300 of FIG. 3, an example DNN model may be formally defined as:

$$f: \mathbb{R}^n \rightarrow \mathbb{R}^{n+1},$$

where n is the number of features generated from the telemetry data. That is, an 'n' dimensional space is mapped to an 'n+1' dimensional space. The image of the function f always has one more dimension when compared to the domain, since the execution time is included as a feature, as discussed above in connection with FIG. 2. In practical terms, the telemetry data from the constrained infrastructure E is being mapped to the telemetry data and execution time of the same workload running on infrastructure K. Once the data standardization is performed, example methods may proceed to the training process. In general then, in order to run a forecasting process, an embodiment may gather data equivalent to the window length (see FIG. 2), that is, an embodiment may use one window from $T_E$ to predict one window in $T_K$.

With continued reference to FIG. 3, the example DNN 300 may provide for the mapping of telemetry data $T_E$ from the constrained infrastructure E to telemetry data $T_K$ and execution time of the same workload running on infrastructure K. The input telemetry data $T_E$ may comprise various encoded features 302, which may be collectively referred to as an 'input vector,' that relate to one or more channels, as discussed in connection with FIG. 2. After passing through, or being processed by, various layers 304 comprising Layer 1, Layer 2, and Layer 3, in this example, the various features 302 may be mapped to corresponding features of the infrastructure K to produce an output vector 306 that includes telemetry data from infrastructure K and an execution time, in the infrastructure K, that is associated with that telemetry data. The layers 304 may be fully connected to each other.

As shown, each layer 304 may have, or be associated with, a respective number of neurons 308. For example, layer 3 has 25 neurons. Further, each layer 304 may have, or define, a linear portion 304a, such as a weight, which may be updated as part of a learning process, to be assigned to one or more of the input features 302. The weights may form a matrix that may be multiplied with the vector that comprises the input features 302. As well, each layer 304 may have, or define, a non-linear portion 304b which may take the form, for example, of an activation function such as an SeLU (Scaled Exponential Linear Unit) for example.

C.3 Telemetry Fingerprinting Extraction and Similarity Definition

For this part of an example method, such as the example method 150 disclosed in FIG. 1, a fingerprint may be extracted from telemetry data, and a metric defined for similarity of the telemetry data to another set of telemetry data, which similarity or not may be determined by a comparison of the respective fingerprints of the telemetry datasets. Example processes for performing these operations are disclosed in U.S. patent application Ser. No. 16/832,031 filed Mar. 27, 2021 (the "'031 Application"), and U.S. patent application Ser. No. 17/376,249 filed Jul. 15, 2021 (the "'249 Application"), both of which are incorporated herein in their respective entireties by this reference.

Figure 4:
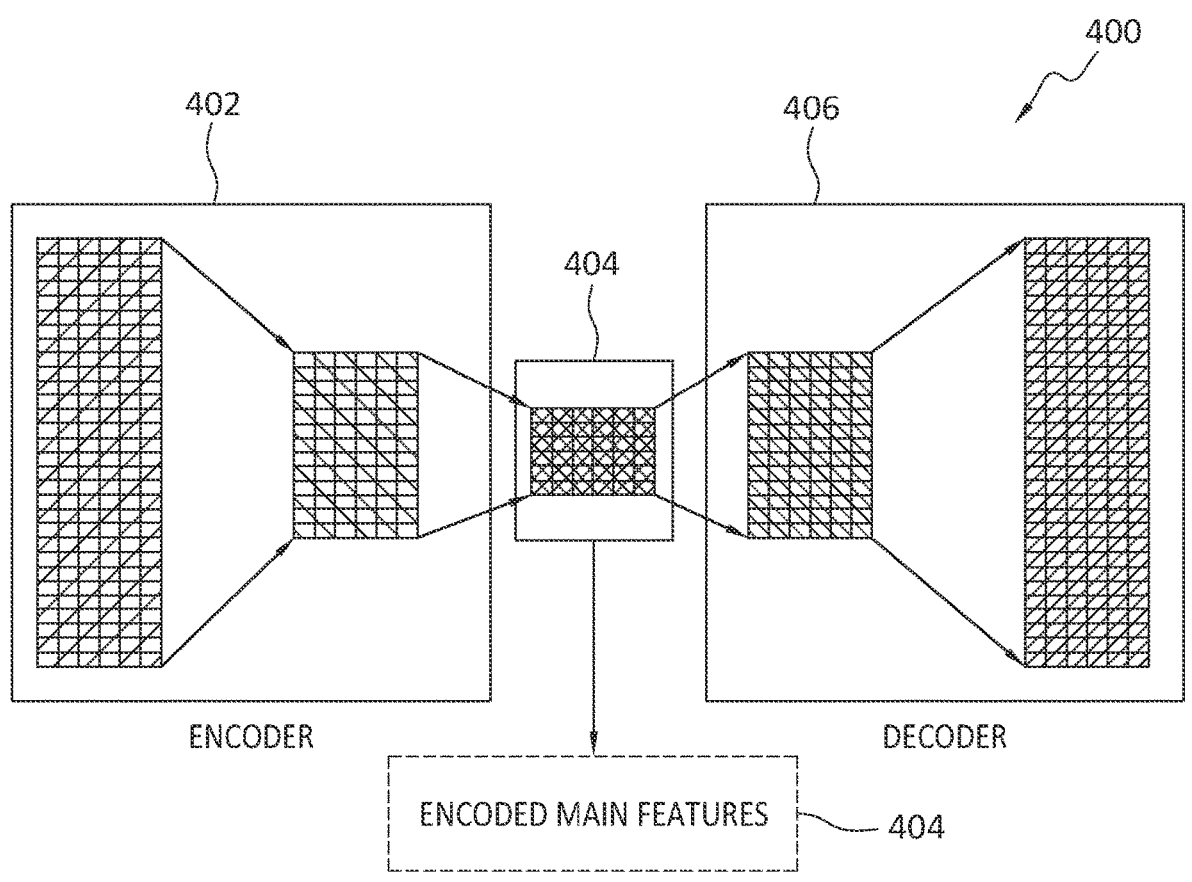
FIG. 4 discloses aspects of an example autoencoder model to implement a fingerprint extraction approach.

With particular reference now to the example configuration 400 of FIG. 4, an autoencoder model is disclosed that may be used to implement a fingerprint extraction process. Particularly, consider an autoencoder 402 that may use the same telemetry data arrangement described earlier herein. In the illustrative example of FIG. 4 however, as expected by an autoencoder structure, the autoencoder 402 may map the main features 404, that is, the telemetry data TE(Wi), to itself. In this way, the middle layer of the network may be extracted by a decoder 406, where the middle layer may be a non-linearly compressed version of the input.

These encoded main features 404 correspond to the fingerprint of the telemetry data. The full mechanism is described in the '031 and '249 Applications, and the approach disclosed in '249 Application may be enhanced by formally defining a similarity function to check for a fingerprint $F_i$ on a catalog C, described by:

$$F_i \in C \Leftrightarrow F_j \in C, D(F_i, F_j) < \in,$$

where the function D refers to a generic element-wise distance function, such as Euclidean distance or cosine similarity, for example. The E value for the threshold may be determined or defined experimentally.

D. Further Discussion

As will be apparent from this disclosure, example embodiments may include various useful aspects and advantages. One of such aspects and advantages concerns control plane data generation. In particular, one aspect of example embodiments is the ability to generate valid data with respect to the resource usage, that is, telemetry data, and execution time of a workload in some specific infrastructure K, without actually executing the workload in the constrained environment E. This approach may save time when building, testing, and validating, a control plane.

As another example, embodiments may implement a self-training architecture which may be able to check if a workload, or some other similar workload, was used for the model training, given a threshold. If the telemetry data associated to the workload was not used, the model retrains itself in order to keep the good quality of the estimations.

A further example of aspects and advantages of some embodiments concerns hardware specialization for some tasks. Particularly, by using the idea of similarities between the workloads, embodiments of the invention may generate clusters of workloads and perform some hardware improvement in order to make some infrastructure more suitable to a type of workloads, such as DNN training or computer vision tasks for example.

E. Experimental Validation

Figure 5:
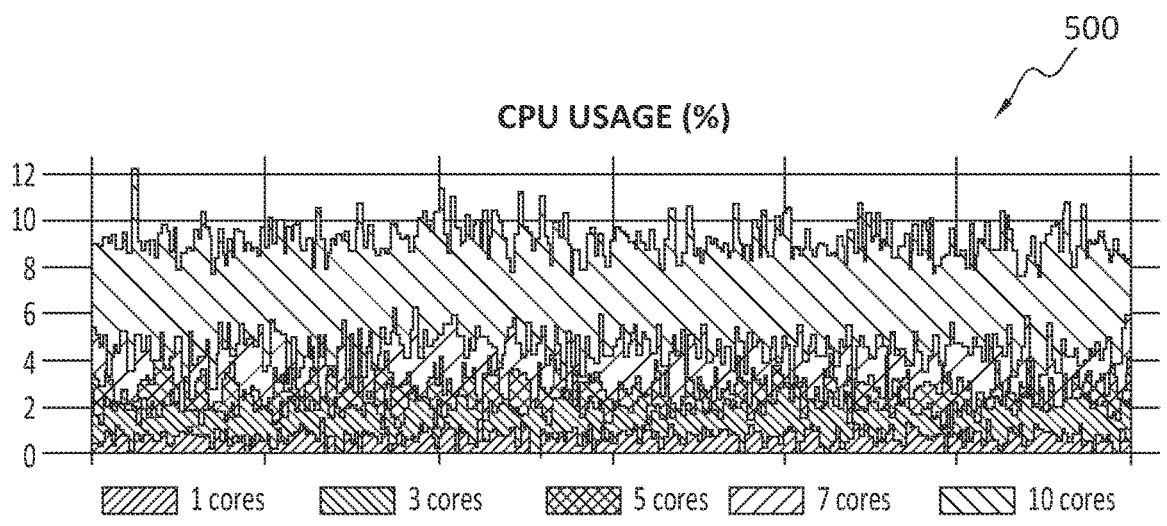
FIG. 5 discloses example telemetry data associated with a DNN training workload.
Figure 5:
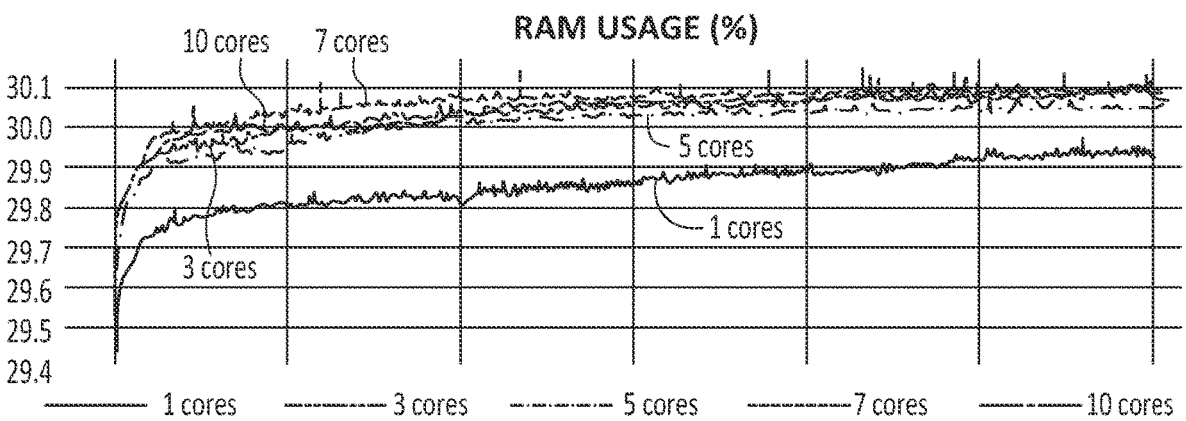
Figure 5:
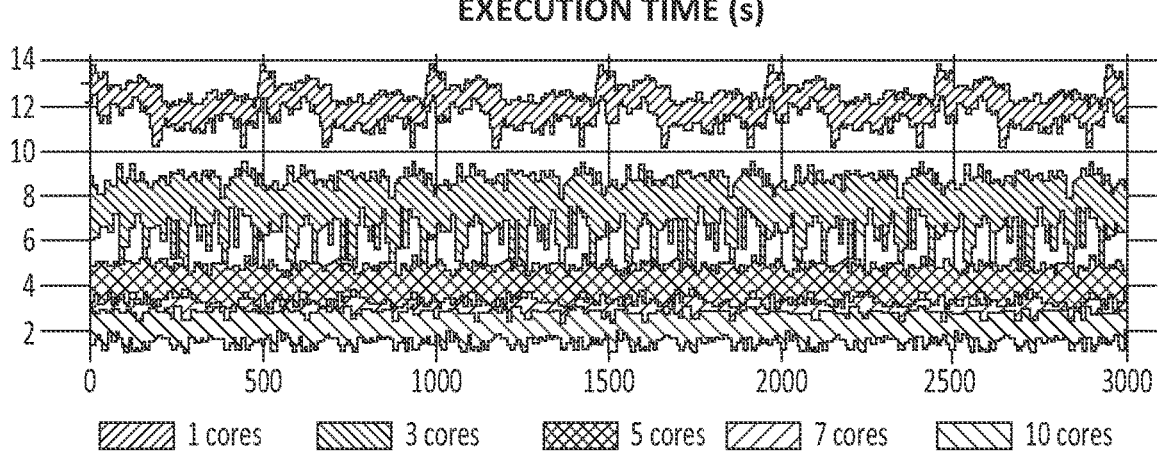

With reference next to FIGS. 5-9, various experiments were performed by the inventors concerning the prediction of workload telemetry using the model described in connection with FIG. 3. The experiments used two different workloads: a DNN training; and, a lane detection algorithm using each frame of a video. The experiments also include a feature that refers to the input size (small, medium or large) used for the workload. The telemetry data 500 of the DNN training is depicted on FIG. 5. As shown there, the CPU usage generally increases with an increase in the number of cores employed. With regard to the RAM usage, there is a substantial differential when 1 core is used, as compared with when 3, 5, 7, or 10, cores are used. In general, RAM usage tended not to vary significantly when the number of cores was increased to 3 or more. Finally, and as shown at the bottom of FIG. 5, job execution time generally tended to decrease with an increase in the number of cores.

Figure 6:
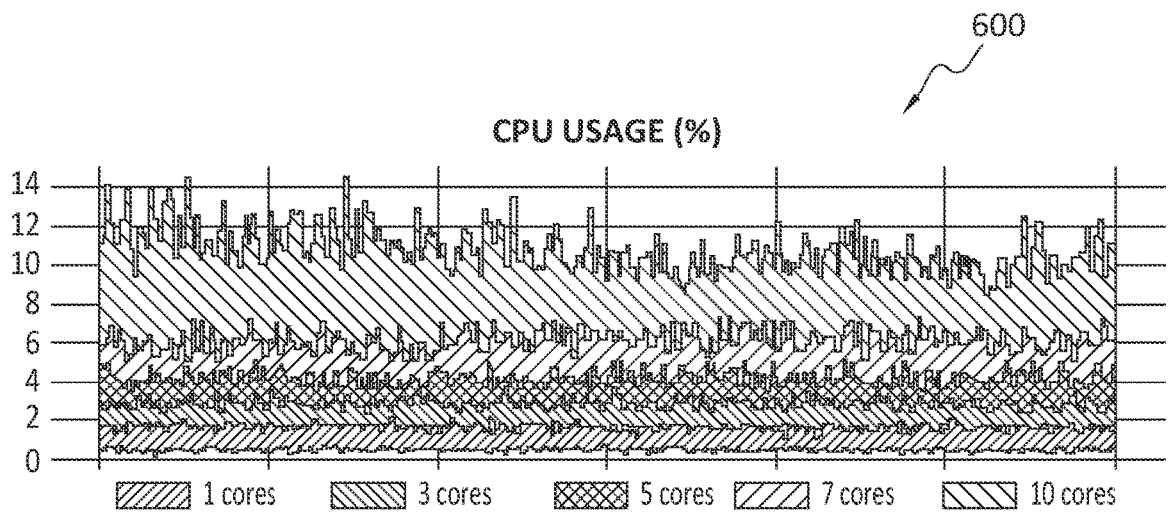
FIG. 6 discloses example telemetry data associated with a lane detection workload.
Figure 6:
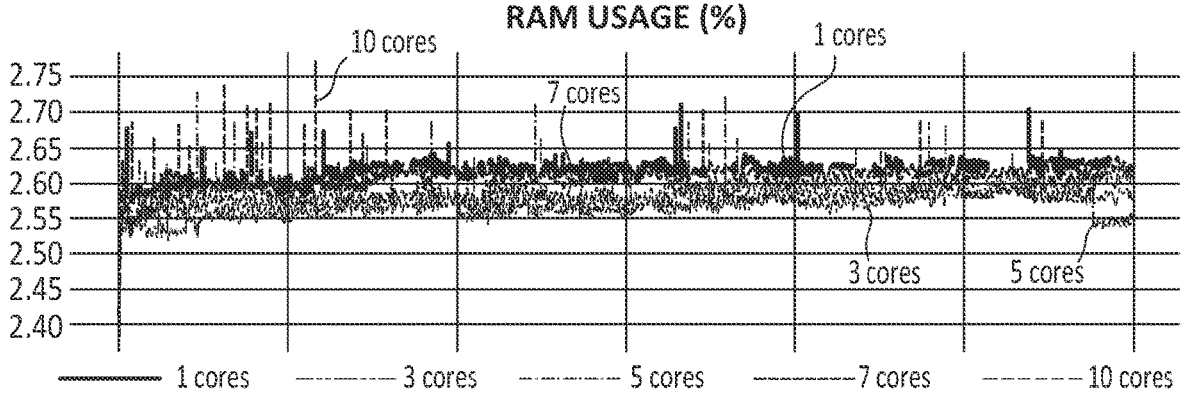
Figure 6:
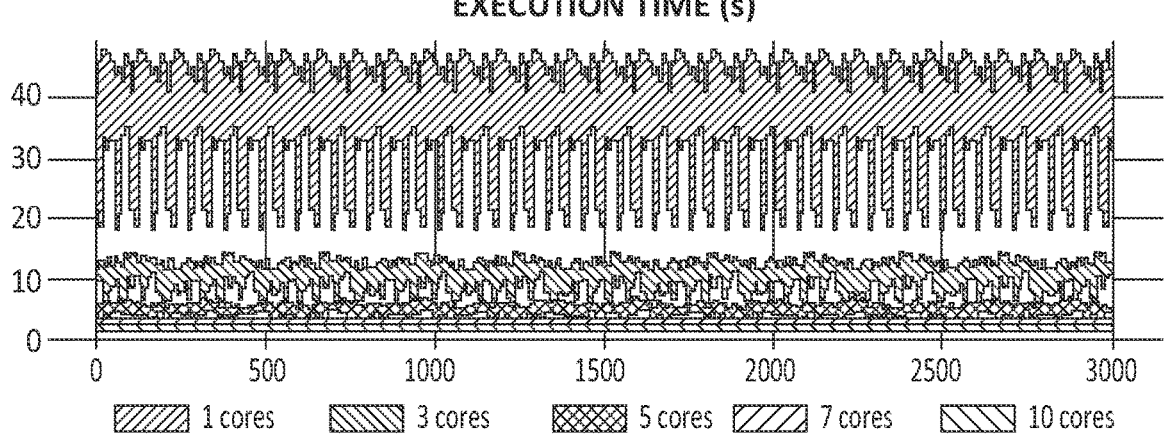
Figure 7:
FIG. 7 discloses and example CPU usage estimation for DNN training workload using an example embodiment of a model.
Figure 7:
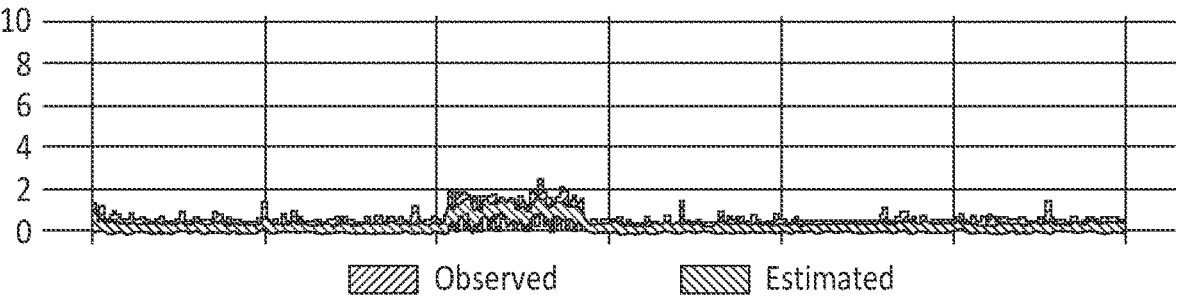
Figure 7:
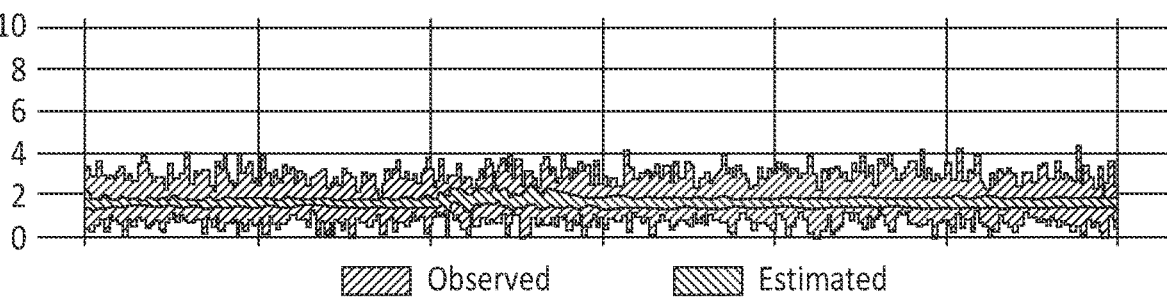
Figure 7:
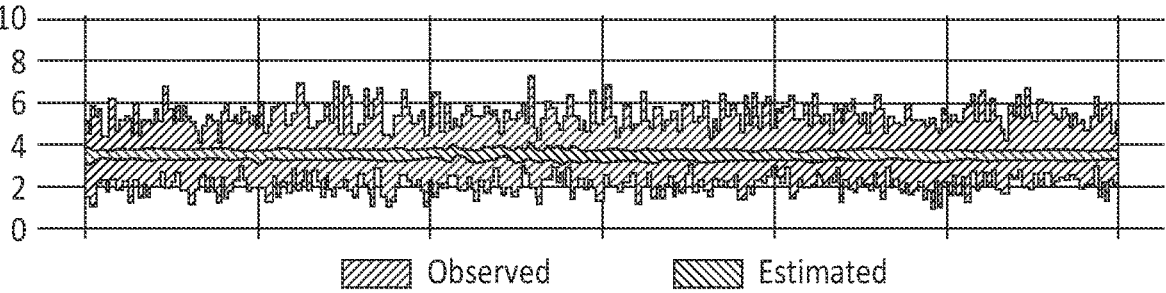
Figure 7:
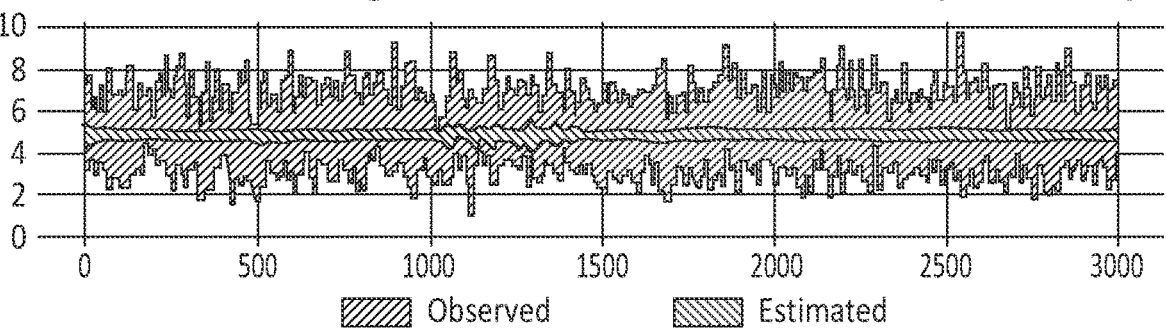

With reference next to FIG. 6, telemetry data 600 associated with the lane detection workload is disclosed. In general, the model was trained using a window size of 10 seconds and assumed an infrastructure with 10 cores as the constrained environment E. A few observations may be made about the results. For example, when there are more cores available, there is more variance in the usage, which leads to higher error rates. The model, however, was able to predict the mean usage, which is adequate to build a control plane. The next sections below show the prediction of CPU usage and execution time, respectively, for each possible target infrastructure.

E.1 Experiment 1—DNN Training Workload→CPU Usage Forecasting

The first experiment concerned CPU usage forecasting. Particularly, FIG. 7 discloses a CPU usage estimation 700 for the DNN training workload using an embodiment of the disclosed model. As shown, estimated and observed CPU usage tended to increase as the number of available cores increased. However, the correlation between observed and estimated CPU usage tended to become weaker as the number of available cores increased.

Figure 8:
FIG. 8 discloses an example execution time estimation for a DNN training workload using an example embodiment of a model.
Figure 8:
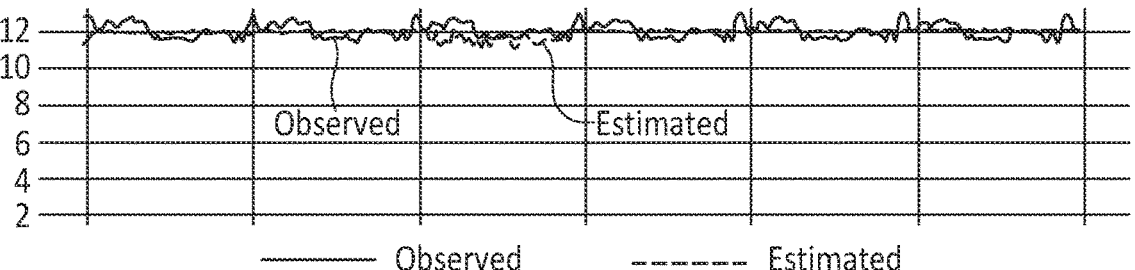
Figure 8:
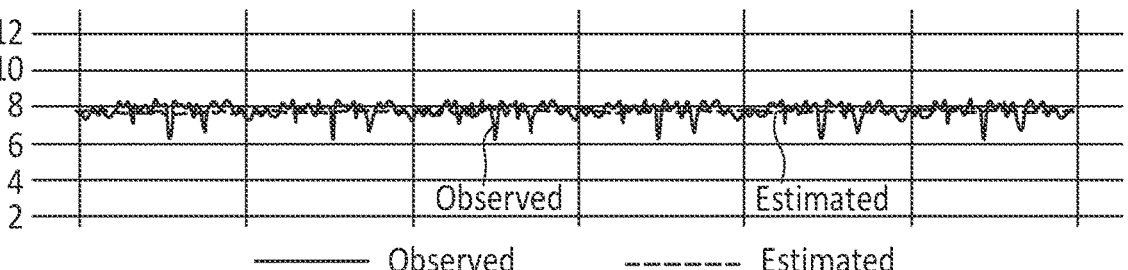
Figure 8:
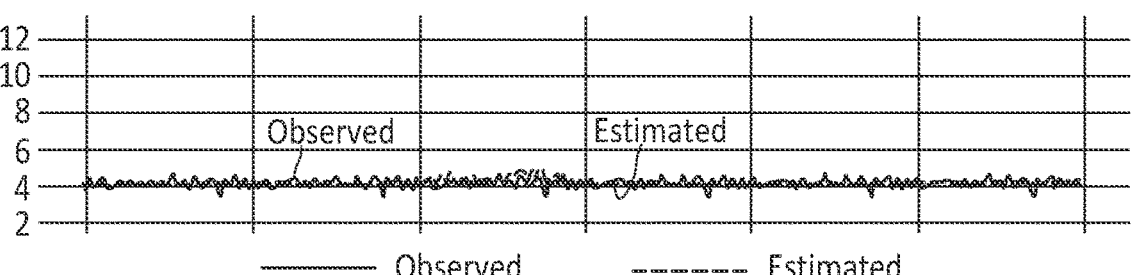
Figure 8:
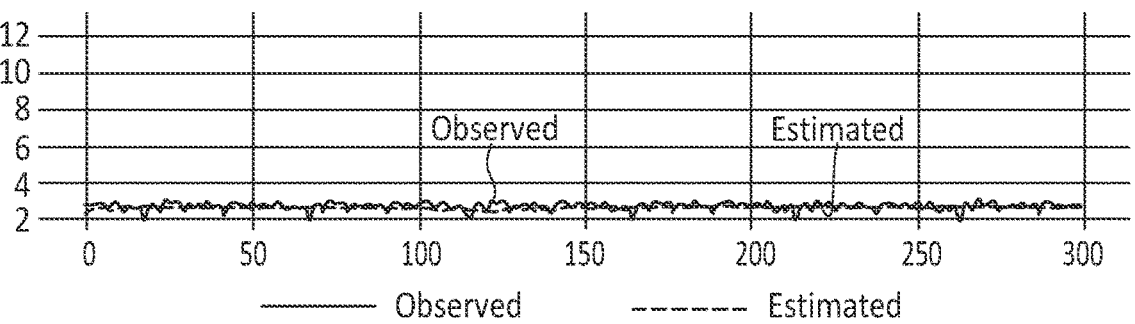

With reference next to FIG. 8, various data 800 are disclosed concerning job execution time forecasting. In particular, FIG. 8 discloses an execution time estimation for a DNN training workload using an embodiment of the disclosed model. In general, the execution time tended to decrease with an increase in the number of cores available, that is, used by the training workload. As well, the correlation between observed and estimated execution times tended to become better the greater the number of cores employed, that is, available for use.

E.2 Experiment 2—Lane Detection Workload→CPU Usage Forecasting

Figure 9:
FIG. 9 discloses an example CPU usage estimation for lane detection workload using an example embodiment of a model.
Figure 9:
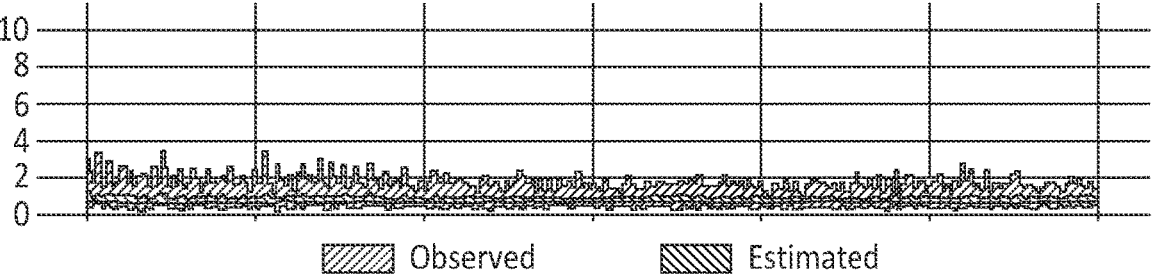
Figure 9:
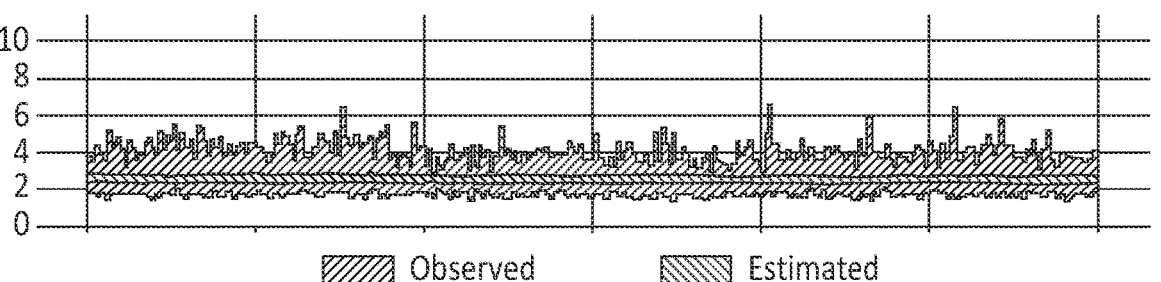
Figure 9:
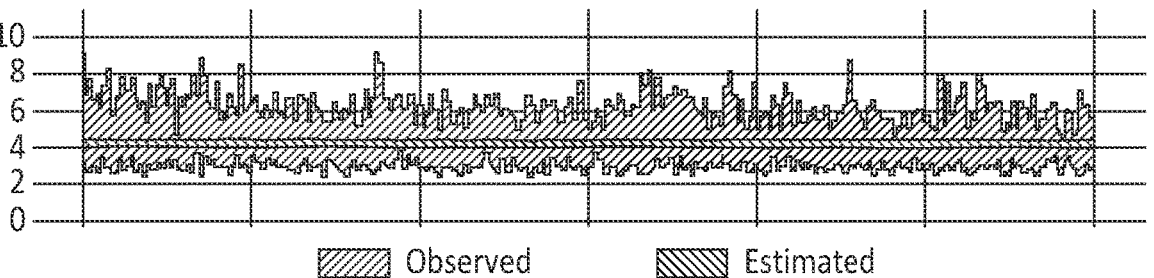
Figure 9:
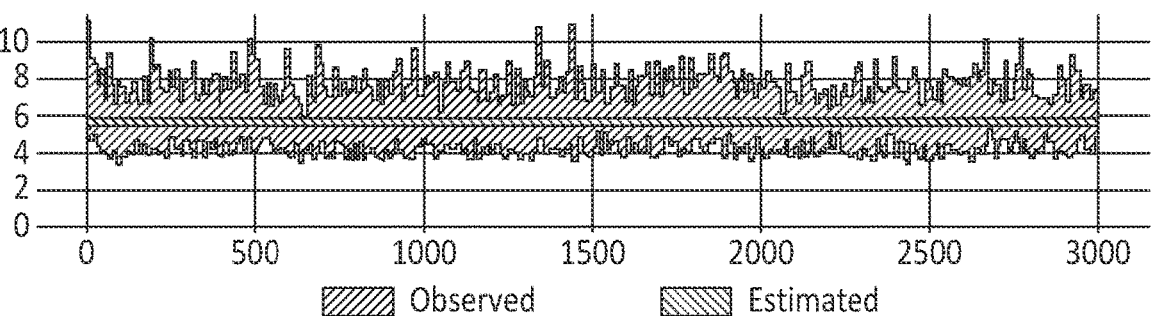

With reference next to FIG. 9, various data 900 are disclosed concerning job execution time forecasting. In particular, FIG. 9 discloses CPU usage estimations for a lane detection workload using an embodiment of the disclosed model. In general, CPU usage tended to increase with an increasing number of cores in use. However, the correlation between estimated and observed CPU usage tended to become weaker as the number of cores in use increased.

Figure 10:
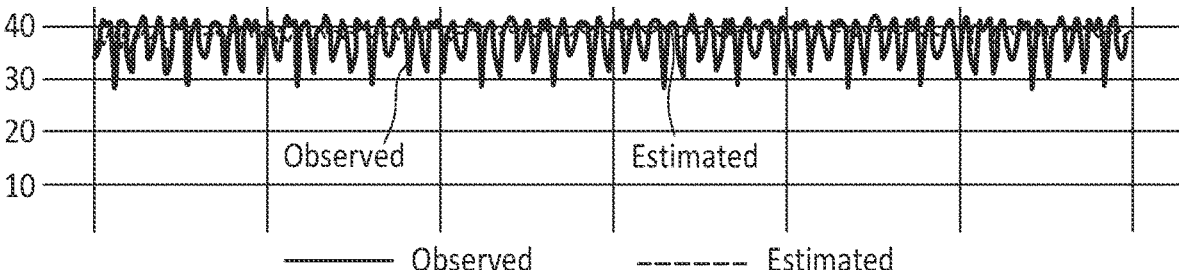
FIG. 10 discloses an example execution time estimation for lane detection workload using an example embodiment of a model.
Figure 10:
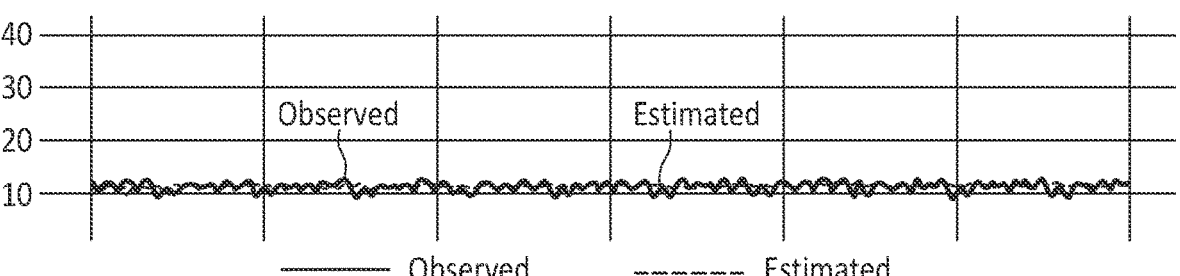
Figure 10:
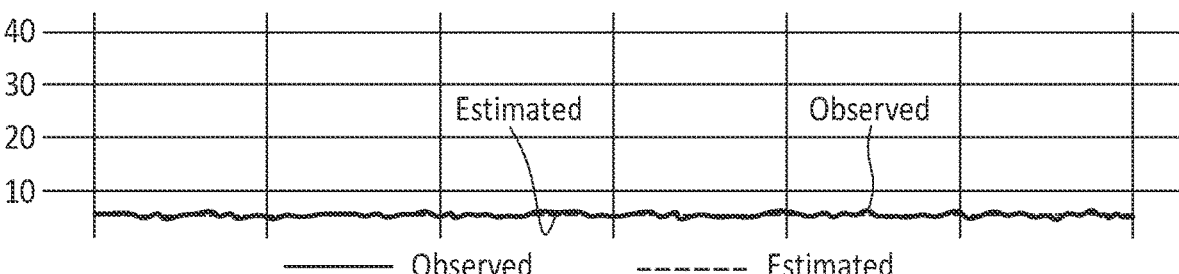
Figure 10:
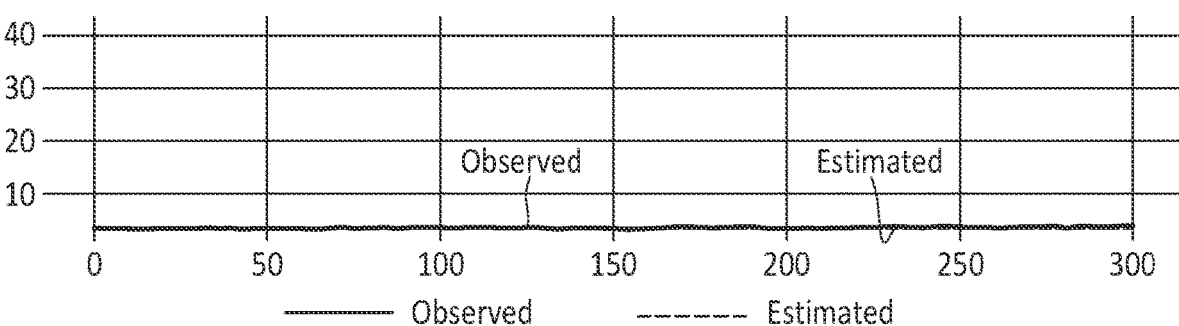

Turning finally to FIG. 10, various data 1000 are disclosed concerning job execution time forecasting. In particular, FIG. 10 discloses execution time estimations for a lane detection workload using an embodiment of the disclosed model. In general, as more cores are available for executing the lane detection workload, the time estimates correspondingly drop. As well, as core availability increases, and workload time estimates decrease, the correlation between observed and estimated workload times improved significantly.

F. Example Methods

It is noted with respect to the example method of FIG. 1 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

G. Further Example Embodiments

Following are some further example embodiments of the invention. These are presented only by way of example and are not intended to limit the scope of the invention in any way.

Embodiment 1. A method, comprising: performing the following operations concerning a model that is operable to predict resource usage and execution time of computing workloads: extracting a fingerprint associated with telemetry data, and the telemetry data was generated based on performance of one of the computing workloads, in a constrained infrastructure; checking a fingerprint catalog to determine if there is a similar fingerprint to the fingerprint; when the similar fingerprint is found in the fingerprint catalog, inferring that the model includes information about the computing workload and the model is able to predict telemetry data and execution time for the computing workload in a target infrastructure; and when a similar fingerprint is not found in the fingerprint catalog, inserting the extracted fingerprint into the fingerprint catalog, and generating a retrained model by retraining the model using the telemetry data associated with the extracted fingerprint.

Embodiment 2. The method as recited in embodiment 1, wherein the model comprises a deep neural network.

Embodiment 3. The method as recited in any of embodiments 1-2, wherein running the model for one of the computing workloads generates a predicted resource usage by the workload, and a predicted execution time for that computing workload.

Embodiment 4. The method as recited in any of embodiments 1-3, further comprising running the retrained model with the telemetry data that is associated with the fingerprint, and with telemetry data obtained by executing the computing workload in the target infrastructure.

Embodiment 5. The method as recited in any of embodiments 1-4, wherein the model uses inputs to generate predicted resource usage and predicted execution time for a computing workload, and the inputs comprise encoded data.

Embodiment 6. The method as recited in embodiment 5, wherein the encoded data is in a form of an input vector, and the model multiplies the input vector with a matrix of weights, where each weight corresponds to a respective input of the input vector.

Embodiment 7. The method as recited in any of embodiments 1-6, wherein the model maps the telemetry data corresponding to the constrained infrastructure to a combination that comprises the telemetry data corresponding to the target infrastructure and an execution time of a computing workload in the target infrastructure.

Embodiment 8. The method as recited in any of embodiments 1-7, wherein the model generates execution time and resource usage predictions without running the computing workload in the constrained infrastructure.

Embodiment 9. The method as recited in any of embodiments 1-8, wherein the telemetry data comprises one or both of CPU usage and RAM usage.

Embodiment 10. The method as recited in any of embodiments 1-9, wherein the telemetry data is represented as an aligned multi-channel time series.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
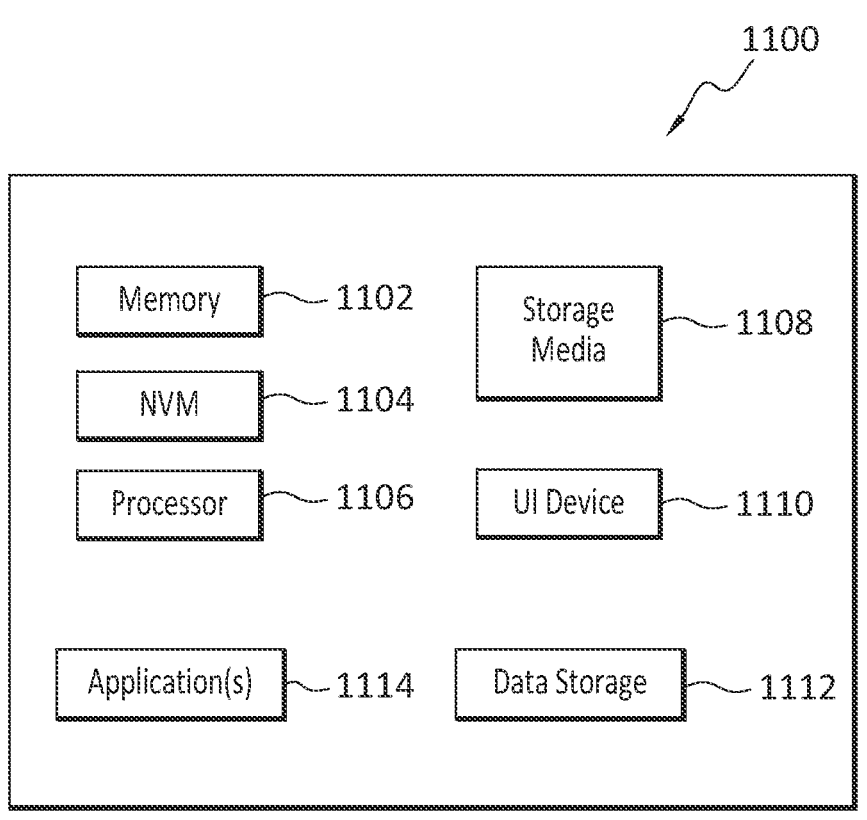
FIG. 11 discloses an example computing entity operable to perform any of the disclosed methods, processes, and operations.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing operations concerning a model that is operable to predict resource usage and an execution time of computing workloads, the operations comprising:

extracting a fingerprint associated with telemetry data, wherein the telemetry data was generated based on performance of computing resources of one of the computing workloads, in a constrained infrastructure;

checking a fingerprint catalog to determine if there is a same or similar fingerprint to the extracted fingerprint;

when the same or similar fingerprint is found in the fingerprint catalog, mapping the telemetry data of the constrained infrastructure to telemetry data of a target infrastructure based on the same or similar fingerprint in the model; and predicting an execution time for the computing workload in the target infrastructure based on an executing time in an infrastructure, which has the same or similar fingerprint in the fingerprint catalog;

when the same or similar fingerprint is not found in the fingerprint catalog, inserting the extracted fingerprint into the fingerprint catalog, and generating a retrained model by retraining the model using the telemetry data associated with the extracted fingerprint; and dynamically allocating computing resources in the constrained infrastructure to the one of the computing workloads based on the telemetry data of the target infrastructure and the retrained model.

2. The method as recited in claim 1, wherein the model comprises a deep neural network.

3. The method as recited in claim 1, wherein running the model for one of the computing workloads generates a predicted resource usage by the workload, and a predicted execution time for that computing workload.

4. The method as recited in claim 1, further comprising running the retrained model with the telemetry data that is associated with the fingerprint, and with telemetry data obtained by executing the computing workload in the target infrastructure.

5. The method as recited in claim 1, wherein the model uses inputs to generate predicted resource usage and predicted execution time for a computing workload, and the inputs comprise encoded data.

6. The method as recited in claim 5, wherein the encoded data is in a form of an input vector, and the model multiplies the input vector with a matrix of weights, where each weight corresponds to a respective input of the input vector.

7. The method as recited in claim 1, wherein the model maps the telemetry data corresponding to the constrained infrastructure to a combination that comprises the telemetry data corresponding to the target infrastructure and an execution time of a computing workload in the target infrastructure.

8. The method as recited in claim 1, wherein the model generates execution time and resource usage predictions without running the computing workload in the constrained infrastructure.

9. The method as recited in claim 1, wherein the telemetry data comprises one or both of CPU usage and RAM usage.

10. The method as recited in claim 1, wherein the telemetry data is represented as an aligned multi-channel time series.

11. A computer readable storage medium having stored therein instructions that are executable by one or more hardware processors to perform operations concerning a model that is operable to predict resource usage and an execution time of computing workloads, the operations comprising:

extracting a fingerprint associated with telemetry data, wherein the telemetry data was generated based on performance of one of the computing workloads, in a constrained infrastructure;

checking a fingerprint catalog to determine if there is a same or similar fingerprint to the extracted fingerprint;

when the same or similar fingerprint is found in the fingerprint catalog, mapping the telemetry data of the constrained infrastructure to telemetry data of a target infrastructure based on the same or similar fingerprint in the model; and predicting an execution time for the computing workload in the target infrastructure based on an executing time in an infrastructure, which has the same or similar fingerprint in the fingerprint catalog;

when the same or similar fingerprint is not found in the fingerprint catalog, inserting the extracted fingerprint into the fingerprint catalog, and

13 generating a retrained model by retraining the model using the telemetry data associated with the extracted fingerprint; and dynamically allocating computing resources in the constrained infrastructure to the one of the computing workloads based on the telemetry data of the target infrastructure and the retrained model.

12. The computer readable storage medium as recited in claim 11, wherein the model comprises a deep neural network.

13. The computer readable storage medium as recited in claim 11, wherein running the model for one of the computing workloads generates a predicted resource usage by the workload, and a predicted execution time for that computing workload.

14. The computer readable storage medium as recited in claim 11, further comprising running the retrained model with the telemetry data that is associated with the fingerprint, and with telemetry data obtained by executing the computing workload in the target infrastructure.

15. The computer readable storage medium as recited in claim 11, wherein the model uses inputs to generate predicted resource usage and predicted execution time for a computing workload, and the inputs comprise encoded data.

16. The computer readable storage medium as recited in claim 15, wherein the encoded data is in a form of an input vector, and the model multiplies the input vector with a matrix of weights, where each weight corresponds to a respective input of the input vector.

17. The computer readable storage medium as recited in claim 11, wherein the model maps the telemetry data corresponding to the constrained infrastructure to a combination that comprises the telemetry data corresponding to the target infrastructure and an execution time of a computing workload in the target infrastructure.

18. The computer readable storage medium as recited in claim 11, wherein the model generates execution time and resource usage predictions without running the computing workload in the constrained infrastructure.

19. The computer readable storage medium as recited in claim 11, wherein the telemetry data comprises one or both of CPU usage and RAM usage.

20. The computer readable storage medium as recited in claim 11, wherein the telemetry data is represented as an aligned multi-channel time series.

\* \* \* \* \*